United States Patent [19]

Herzl

[11] 4,307,619
[45] * Dec. 29, 1981

[54] DUAL OUTPUT VORTEX-SHEDDING FLOWMETER HAVING DRAG-ACTUATED TORSIONAL SENSOR

[75] Inventor: Peter J. Herzl, Morrisville, Pa.

[73] Assignee: Fischer & Porter Co., Warminster, Pa.

[*] Notice: The portion of the term of this patent subsequent to Oct. 7, 1997, has been disclaimed.

[21] Appl. No.: 121,117

[22] Filed: Feb. 13, 1980

Related U.S. Application Data

[63] Continuation-in-part of Ser. No. 13,557, Feb. 21, 1979, which is a continuation-in-part of Ser. No. 944,624, Sep. 21, 1978.

[51] Int. Cl.³ .............................................. G01F 1/32
[52] U.S. Cl. .................................................. 73/861.24
[58] Field of Search ........................... 73/861.22, 861.24

[56] References Cited

U.S. PATENT DOCUMENTS

| | | | |
|---|---|---|---|
| 3,116,639 | 1/1964 | Bird | 73/861.24 |
| 3,720,104 | 3/1973 | Zanker | 73/861.24 |
| 3,888,120 | 6/1975 | Burgess | 73/861.24 |
| 4,226,117 | 10/1980 | Herzl | 73/861.22 |

*Primary Examiner*—Herbert Goldstein
*Attorney, Agent, or Firm*—Michael Ebert

[57] ABSTRACT

A dual output vortex-shedding flowmeter in which a liquid or gas to be metered is conducted through a flow tube having a shedding body transversely supported thereon, the flowmeter being usable in a custody transfer system requiring two independent output signals. Torsionally-supported behind the body and spaced therefrom by a gap is a drag-actuated sensor which includes a pair of parallel legs symmetrically disposed with respect to a spindle forming the fulcrum axis of the sensor, this axis being normal to the longitudinal axis of the tube. In operation, torques are developed alternately in the clockwise and counterclockwise directions, causing the torsionally-supported sensor to oscillate at a frequency proportional to the flow rate of the fluid. These oscillations are converted into corresponding electrical signals by a pair of transducers coupled to opposing ends of the spindle to provide two independent outputs.

7 Claims, 7 Drawing Figures

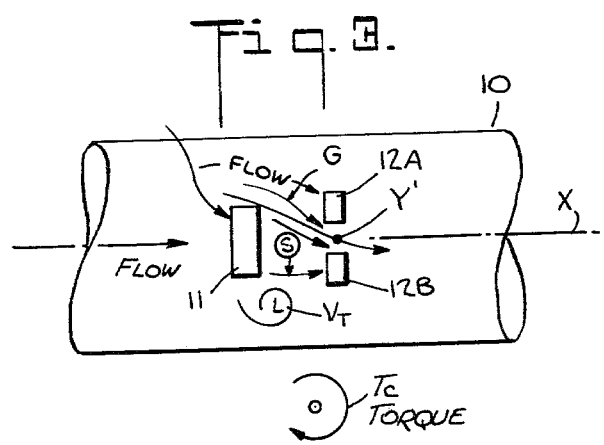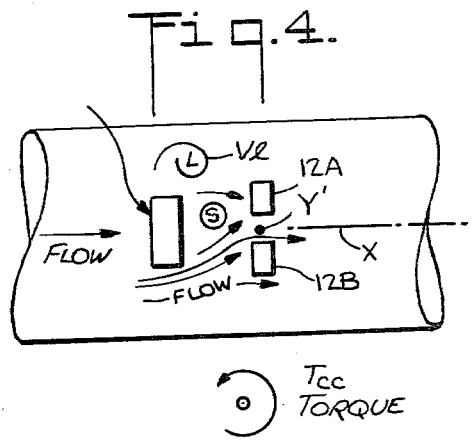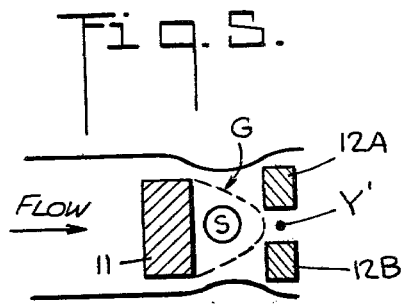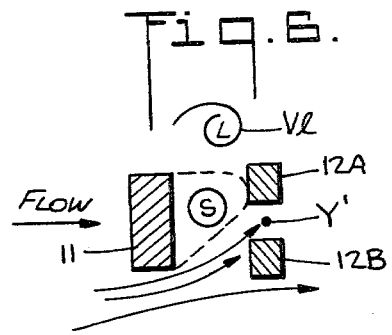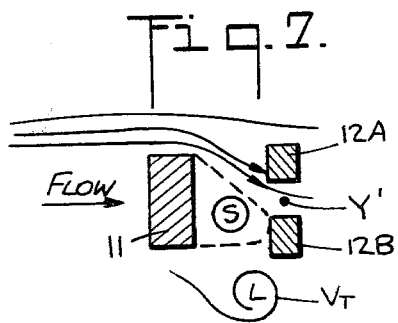

DUAL OUTPUT VORTEX-SHEDDING FLOWMETER HAVING DRAG-ACTUATED TORSIONAL SENSOR

RELATED APPLICATIONS

This application is a continuation-in-part of my copending application Ser. No. 013,557, filed Feb. 21, 1979, entitled "Vortex Shedding Flowmeter Having a Sensing Vane," which in turn is a continuation-in-part of an original application Ser. No. 944,624 having the same title, filed Sept. 21, 1978, the entire disclosures of these copending applications being incorporated herein by reference.

BACKGROUND OF INVENTION

This invention relates generally to vortex-shedding flowmeters, and more particularly to a dual-output flowmeter of this type which includes a drag-actuated torsional sensor, whereby the meter is useful for both liquid and gas flow rate measurement, the sensor being associated with a pair of transducers to provide two independent output signals.

In a vortex-shedding flowmeter, the frequency of shedding is precisely related to the velocity of fluid passing through the flow tube containing the shedding body, but only as long as the separation point from which shedding takes place remains fixed and the feedback mechanism causing shedding to transfer from one side of the body to the other remains constant.

In its most elementary form, the shedding body is a simple cylinder mounted across the flow tube. The difficulty experienced with this type of shedding body is that the separation point (i.e., the location at which vortices leave the body) shifts with Reynolds numbers. As a consequence, the vortex trail tends to meander down the flow tube behind the shedding body. If the angle of this vortex trail changes, the feedback mechanism causing shedding to take place from alternate sides of the shedding body also undergoes change, thereby giving rise to deviations from the predicted frequency of the shedder. As a result, meter accuracy and meter repeatability are poor.

Vortex meters are commercially available having shedding bodies which are designed to overcome these drawbacks by optimizing the shedding body width and geometry in relation to the flow tube size. The U.S. Pat. No. 3,572,117 to Rodely discloses a bluff body flowmeter having a prescribed geometric configuration designed to minimize irregularities in the oscillating wake. These meters constitute an improvement over meters having cylindrical shedding bodies. However, under less-than-ideal operating conditions, the vortex wake or trail created by these non-cylindrical shedding bodies will still, on occasion, become intermittent or meander, to produce the same disadvantages encountered with cylindrical bodies.

The Burgess U.S. Pat. No. 3,589,185 discloses an improved form of vortex-type flowmeter wherein the signal derived from the fluid oscillation is relatively strong and stable to afford a favorable signal-to-noise ratio insuring accurate flow-rate information over a fairly broad range. In this meter, an obstacle assembly is mounted in the flow conduit, the assembly being constituted by a block positioned across the conduit with its longitudinal axis at right angles to the direction of fluid flow, a strip being mounted across the conduit behind the block and being spaced therefrom to define a gap which serves to trap Karman vortices and to strengthen and stabilize the vortex street. This street is sensed to produce a signal whose frequency is proportional to flow rate.

In another Burgess patent, U.S. Pat. No. 3,888,120, dealing with a vortex-type flowmeter, there is disclosed an obstacle assembly constituted by a fixed front section contoured to cause flow separation of the incoming fluid stream whose flow rate is to be measured, and a rear non-streamlined section which is shaped to interfere with the vortex street in the wake of the front section and is cantilevered from the front section to define a gap. The rear section is slightly deflectable relative to the front section whereby it is excited into minute vibrations by the vortex street. These vibrations are sensed by a strain gauge to produce a signal proportional to flow rate.

The liquid vortex flowmeter Model 10 LV 1000, manufactured by the Fischer & Porter Company of Warminster, Pa., the assignee herein, operates in accordance with the principles set forth in Burgess U.S. Pat. No. 3,888,120. This liquid vortex flowmeter constitutes a commercially successful version of a vortex meter utilizing a two-section shedder to create a vortex street. It is an excellent flowmeter whose rate accuracy on low viscosity fluids, such as water, within a broad operating range is about 2%.

However, some flow rate measuring applications require a higher order of accuracy and still broader operating range. Also, in some applications the fluid being measured is subject to viscosity changes, turbulence and other disturbances which adversely affect the accuracy of the readings obtained with meters of the 10 LV 1000 type.

To provide a vortex-type flowmeter in which the frequency of vortex shedding is accurately related to fluid velocity regardless of turbulence, changes in fluid viscosity and other disturbing factors which tend to degrade this relationship, applicant's prior U.S. Pat. No. 4,030,355 (Herzl) discloses a flowmeter whose obstacle assembly is constituted by a fixed front section and a deflectable rear section cantilevered by beams from the front section, the rear section having a central opening therein to provide a fluid passage.

The front section of the Herzl patent flowmeter is contoured to cause flow separation of the incoming fluid, thereby dividing the stream to create a series of vortices that alternate with respect to the center line of the front section. As the vortices detach themselves from the front section, alternate areas of low pressure are created that shift from side-to-side, producing an oscillating thrust behind the front section and causing the deflectable rear section to swing periodically at a frequency proportional to the incoming fluid velocity. This swing is sensed by a strain gauge mounted on a beam from which the rear section is cantilevered.

The central opening in the rear section permits the flow of fluid therethrough and acts to smooth out turbulence behind the front section to a degree sufficient to create an orderly vortex tail straight down the center of the flow tube. This central passage significantly improves the accuracy and repeatability of the flowmeter.

In a vortex-shedding flowmeter of the Herzl patent type, the deflectable rear section is relatively heavy; and while this flowmeter has excellent hydraulic characteristics, it is quite sensitive to acceleration effects. Though it is possible to partially balance out these undesirable acceleration effects, some unbalance always remains.

Moreover, while the Herzl patent flowmeter design is generally effective in liquid flow rate measurement, it is not generally acceptable for metering gas flow. The reason for this limitation is that in liquid use, relatively large forces are generated by the vortices, whereas in gas flow measurement, the generated forces are smaller by many orders of magnitude, and the meter sensitivity is insufficient to respond effectively thereto, particularly if fading is encountered in the fluidic oscillations, as is sometimes the case.

In my copending application Ser. No. 013,557, now U.S. Pat. No. 4,226,117, of which the present application is a continuation-in-part, there is disclosed a vortex meter having a drag-actuated torsional sensor whose sensitivity is such as to render the meter accurately responsive to vortices generated either by liquid or gaseous streams. The fluid to be metered is conducted through a flow tube having a shedding body transversely mounted therein. Torsionally supported behind the shedding body and spaced therefrom by a gap is a drag-actuated sensor which includes a pair of parallel legs symmetrically disposed with respect to the fulcrum axis of the sensor, this axis being normal to the longitudinal axis of the flow tube.

In operation, as the incoming fluid stream is divided by and flows past the shedding body, it creates a stagnant zone in the gap, the zone being initially aligned with the tube axis. As vortices are successively detached from the shedding body and appear alternately on either side of the gap, the low pressure produced by each vortex acts to draw the stagnant zone in front of the adjacent leg of the sensor, the fluid flow then going around and past the other leg, thereby developing a torque about the fulcrum.

Since the vortices alternate, the resultant torques are developed alternately in the clockwise and counter-clockwise direction, to cause the torsionally mounted sensor to oscillate at a frequency proportional to the flow rate of the fluid being metered. These oscillations are converted by a suitable transducer into a corresponding electrical signals.

The vortex meter disclosed in my copending application yields a single output signal whose frequency is proportional to the flow rate of the fluid being metered. In many instances, it is necessary to provide two independent output signals. Thus in a custody transfer system in which fluid produced by a utility or a fluid supply company is fed to a customer who pays the company on the basis of the mass or volume of fluid consumed, the customer is provided with a flowmeter which indicates the flow rate of the fluid being drawn, so that the customer has a running reading thereof. In this situation, it is necessary that the supply company be given a concurrent reading from the same meter, this reading determining the billing to the customer for the fluid actually consumed.

To this end, it is ncessary that the meter yield two independent output signals; one affording the customer a field reading, and the other, which is transmitted to the company, giving the company a supply station reading. These two concurrent readings make it possible to check and verify the operation of the flowmeter and to settle possible disputes as to billings.

SUMMARY OF INVENTION

In view of the foregoing, the main object of the invention is to provide a dual-output vortex-shedding flowmeter having a sensing system which renders the meter effective and accurate in both liquid and gas flow measurement, the sensing system being associated with a pair of transducers yielding two independent output signals useful in custody service operations.

Briefly stated, in a flowmeter in accordance with the invention, the fluid to be metered is conducted through a flow tube having a shedding body transversely mounted therein. Torsionally supported behind the shedding body and spaced therefrom by a gap is a drag-actuated sensor which includes a pair of parallel legs symmetrically disposed with respect to a spindle forming the fulcrum axis of the sensor, this axis being normal to the longitudinal axis of the flow tube.

In operation, as the incoming fluid stream is divided by and flows past the shedding body, it creates a stagnant zone in the gap, the zone being initially aligned with the tube axis. As vortices are successively detached from the shedding body and appear alternately on either side of the gap, the low pressure produced by each vortex acts to draw the stagnant zone in front of the adjacent leg of the sensor, the fluid flow then going around and past the other leg, thereby developing a torque about the fulcrum.

Since the vortices alternate, the resultant torques are developed alternately in the clockwise and counter-clockwise direction, to cause the torsionally-mounted sensor to oscillate at a frequency proportional to the flow rate of the fluid being metered. These oscillations are converted into corresponding electrical signals by a pair of transducers coupled to opposing ends of the spindle to provide two independent outputs as required in a custody service system.

OUTLINE OF DRAWINGS

For a better understanding of the invention as well as other objects and further features thereof, reference is made to the following detailed description to be read in conjunction with the accompanying drawings, wherein:

FIG. 3 is a schematic view of the first embodiment, showing the behavior of the meter when a vortex is detached from one edge of the shedding body;

FIG. 4 is a sectional view of the first embodiment, showing the behavior of the meter when a vortex is detached from the other edge of the body; and FIGS. 5, 6 and 7 schematically illustrate three successive stages in the operation of the meter.

DESCRIPTION OF INVENTION

Figure 1:
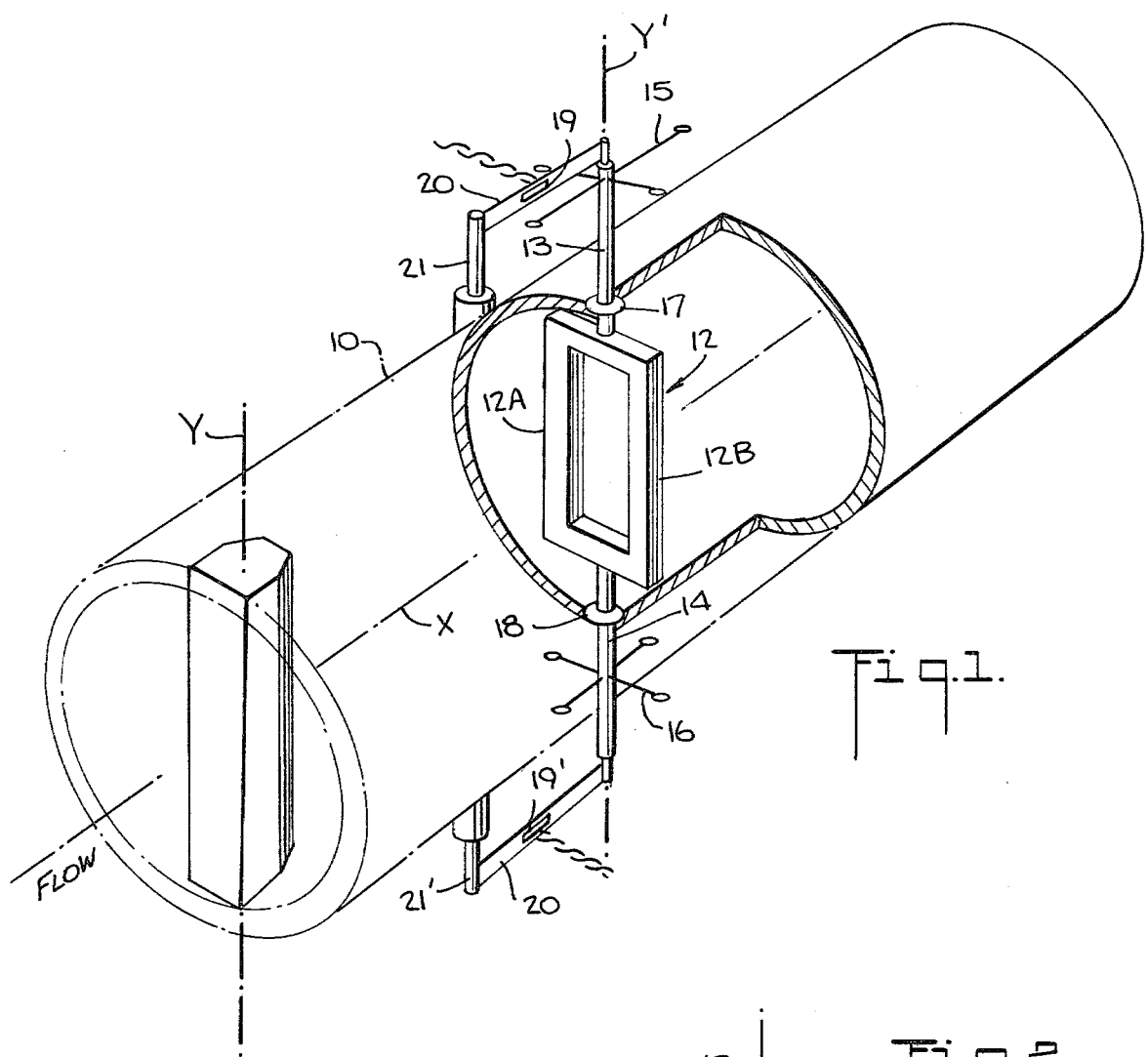
FIG. 1 is a schematic view, in perspective, of a vortex-shedding flowmeter which includes a drag-actuated sensor and a pair of transducers in accordance with the invention.
Figure 2:
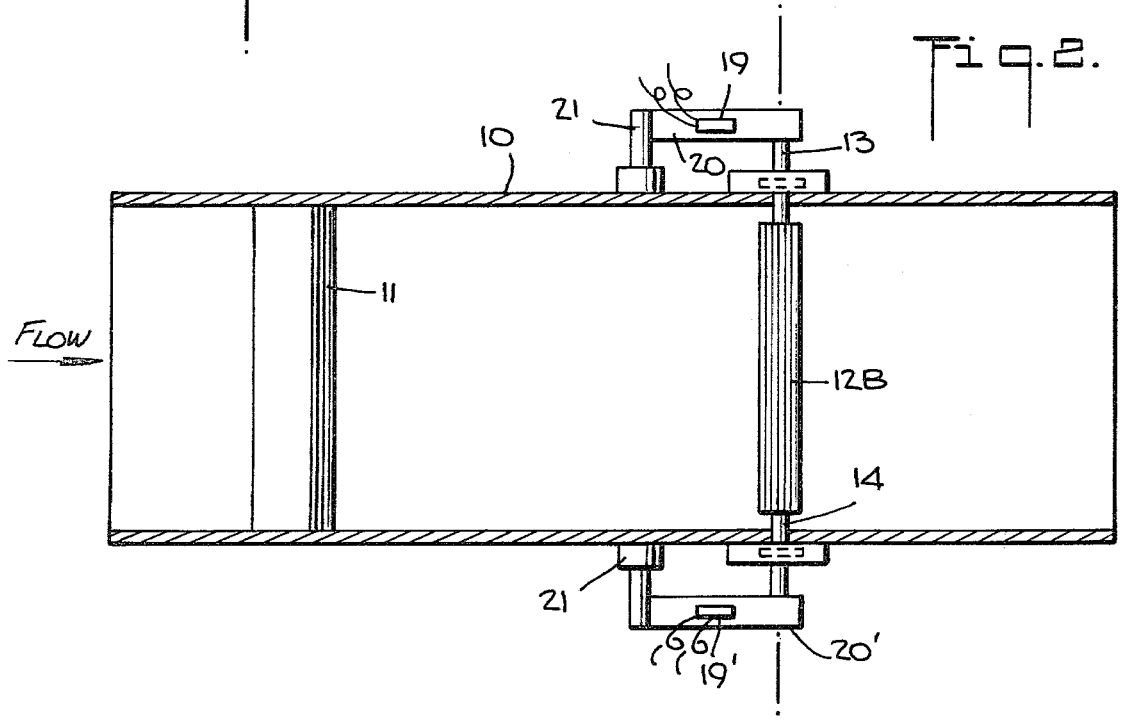
FIG. 2 is a longitudinal section taken through the flowmeter.

Meter Structure:

Referring now to FIGS. 1 to 2, there is shown a dual-output flowmeter of the vortex-shedding type in accordance with the invention, the meter including a flow tube 10 which, in practice, is interposed in the line carrying a liquid or gas whose flow is to be metered.

Mounted transversely within flow tube 10 (shown as having a circular cross-section) is a bluff body or shedder 11 having a generally square cross-section, the rear corners of the block being bevelled. The long axis Y of the shedder is perpendicular to the longitudinal flow axis X of the tube. Incoming flow which impinges on shedder 11 is divided thereby, producing fluidic perturbations in the form of a Karman vortex street. The shedder may be in any known effective form and have a geometry of the type disclosed in the above-identified patents.

Mounted transversely at a downstream position in tube 10 is a drag-actuated torsional sensor 12 having a configuration of a rectangular frame provided with a pair of parallel legs 12A and 12B. Sensor 12 is pivotally supported by a spindle constituted by trunnions 13 and 14 which are attached to the frame at the exact center thereof along a fulcrum axis Y' parallel to axis Y and perpendicular to flow axis X. The sensor is statically and dynamically balanced with respect to fulcrum axis Y', legs 12A and 12B being symmetrical relative to this axis.

In practice, the sensor may be fabricated of a metal such as aluminum or titanium which is non-reactive with respect to all fluids being metered, or of a high-strength, lightweight synthetic plastic material which is chemically immune to these fluids. Since the mass distribution of the sensor frame is such that most of the mass is close to the fulcrum axis, the sensor has a low moment of inertia.

Trunnions 13 and 14 of the spindle on which the sensor is pivotally supported project through the wall of flow tube 10 into trunnion supports 15 and 16. These supports are sealed with "O" rings 17 and 18 of elastomeric material, such as neoprene. Supports 15 and 16 are constituted by torsional suspensions formed by wires of resilient mental such as piano wire which extend between the trunnions and fixed anchors. These torsional suspension components limit pivot motion at maximum torque to a microscopic motion in the order of a half-micron at the "O" ring positions. The torsional suspension may, in practice, be effected by other means, such as hollow metal tubes of flexible material.

To detect the microscopic vibratory motion of sensor 12, a pair of transducers is provided which are operatively coupled to opposite ends of the spindle. The transducer at one end of the spindle in the form of a strain gauge 19 is mounted on a resilient beam 20, one end of which is attached to trunnion 13, the other to a fixed anchor 21 whereby deformation of the beam resulting from a slight motion of the trunnion is translated by gauge 18 into a corresponding electrical signal. The transducer at the other end of the spindle is constituted by a strain gauge 19' mounted on a resilient beam 20', one end of which is attached to trunnion 14, the other to a fixed anchor 21'.

Thus as the sensor oscillates about its fulcrum axis in accordance with the fluidic oscillations, two independent signals having the same frequency are generated, each of which is indicative of flow rate. In practice, the transducers to convert oscillatory motion into an electrical signal may be a piezoelectric element, a semi-conductor device or a wire strain gauge, or any suitable inductive, capacitive or any other micromotion or strain sensor. These two signals in a custody service system provide a field reading of flow rate and a concurrent supply station reading.

Operation:

In FIG. 3, the shedder is schematically represented by rectangular element 11 and the pair of legs of the sensor by smaller rectangular elements 12A and 13B positioned behind shedder 11 to define a gap G. The incoming fluid to be metered is divided by shedder 11 into two streams passing by the opposing edges of the shedder to produce vortices alternately on one side and then on the other side of gap G at a repetition rate proportional to the flow rate.

As a result of this shedding action, a moving train of vortices $V_r$ travels down the right side, and a moving train of vortices $V_l$ travels down the left side of flow tube 10. As the fluid streams flow past shedder 11, a stagnant zone S is developed in gap G, which zone is initially aligned with the flow tube axis X.

FIG. 3 shows a single vortex $V_r$ on the right side of the flow tube adjacent gap G, this vortex creating a low pressure region L. Low pressure region L acts to displace the stagnant zone S from tube axis X and to draw it in the direction of the low pressure region L to a stable position in front of leg 12B of the rear sensor. As a consequence of such stagnant zone displacement, the incoming fluid is caused to flow around and past the other leg 12A and through the open passage between the legs. This action creates a drag on leg 12A and produces a torque $T_c$ about fulcrum axis Y' in the clockwise direction.

In FIG. 4, the situation is reversed; for now we have the succeeding vortex $V_l$ which appears on the left side of flow tube 10 adjacent gap G to develop a low pressure region L which pulls stagnant zone S to a stable position in front of leg 12A. In this case, the incoming fluid is caused to flow around and past leg 12B and through the open passage between the legs to create a drag on leg 12B, producing a torque $T_{cc}$ about fulcrum axis Y' in the counterclockwise direction. Thus the torsionally-mounted rear sensor is caused to oscillate about fulcrum axis Y' at a rate in accordance with the flow rate of the fluid being metered.

The sensor arrangement is inherently well balanced; for the structure thereof is essentially symmetrical with respect to its central pivot or fulcrum axis Y'. While a balanced sensor has obvious functional and structural advantages, it is particularly useful in gas metering; for the gas densities are much lower than liquid densities, resulting in much smaller vortex forces. And because the balanced sensor is pivoted in a torsional suspension that allows only microscopic motion, all motion being absorbed in the flexing component of the suspension, sticking problems are obviated.

The frequency response of a vortex-shedding flowmeter in which a deflectable section or a pivoted vane is excited into vibration varies in accordance with the square root of the actuating force produced by the fluidic oscillations divided by the square root of the moment of inertia. The moment of inertia of a body such as a pivoted vane or a deflectable section, with reference to its axis of rotation, is the sum of the masses of all of its component parts, each multiplied by a second power of its distance from the axis of rotation.

Thus the moment of inertia of a body depends upon the distribution of its matter as well as upon its mass. For example, if two wheels have exactly the same diameter and the same mass, but in one the mass is concentrated near the periphery and is therefore far from the axis of rotation, whereas in the other, the mass is distributed between the periphery and the axis, the first wheel will have a much greater moment of inertia.

Because existing forms of deflectable sections and pivoted vanes in vortex-type flowmeters to sense fluidic oscillations, such as those disclosed in the above-identified Burgess U.S. Pat. No. 3,888,120, have a relatively high moment of inertia, their frequency response, especially in the high frequency portion of the operating range, is poor. This drawback may not be significant when measuring low velocity flows, but it becomes serious in gas metering situations where relatively high velocities such as 100 ft.-per-second are normally encountered.

Thus in a vortex-shedding flowmeter having a one and one-half inch diameter, a gas velocity of 100 ft.-per-second results in a fluidic shedding frequency of about 700 Hz. Unless the moment of inertia of the deflectable section or pivoted vane is low, it is very difficult to follow this very high frequency; and since known forms of these sensing elements have a high moment of inertia, their response at high frequencies is unsatisfactory. In the present invention, in which the sensor structure is statically and dynamically balanced relative to its fulcrum axis and has a relatively low moment of inertia, the frequency response is excellent.

Another advantage of the invention is that the torsionally-mounted sensor is less subject to fading phenomenon than previously known forms. To illustrate this point, FIGS. 5, 6 and 7 show three possible conditions that could exist with flow going past shedder 11 and rear sensor 12 defined by legs 12A and 12B.

As shown in FIG. 5, the flow does not appear to be stable, in that flow from one or the other edge of shedder 11 seeks to go through the open passage between legs 12A and 12B. This condition is comparable to an electrical flip-flop which lacks a stable center position. Because the stagnant zone S in gap G naturally seeks to shift toward leg 12A or 12B, a somewhat unstable condition exists in the absence of vortices.

When, however, a vortex $V_r$ appears on the right side of gap G and a vortex $V_l$ thereafter appears on the left side of gap G, the resultant low pressure regions L act to bias the fluidic forces. A relatively small pressure force causes stagnant zone S to switch from side to side as alternative vortices are shed. Once the stagnant zone S has switched to a position in front of leg 12B (FIG. 6) or in front of leg 12A (FIG. 7), the other leg is exposed to the full drag force.

Since the shedding action only acts to steer stagnant zone S which tends to be bi-stable, then even a small vortex of the type encountered when fading occurs, is able to switch stagnant zone S to the appropriate leg position.

In other words, when strong vortices are produced under normal operating conditions, a stagnant zone S is alternately switched from leg-to-leg in a position manner; but when, as occasionally happens, fading gives rise to weaker vortices, switching nevertheless continues to take place. As a consequence, a very even and uniform signal output is obtained, regardless of the varying strength of the fluidic vortices developed in the flow tube.

While there has been shown and described a preferred embodiment of a dual output vortex-shedding flowmeter having drag-actuated torsional sensor in accordance with the invention, it will be appreciated that many changes and modifications may be made therein without, however, departing from the essential spirit thereof.

I claim:

1. A dual-output vortex-shedding flowmeter comprising:
   A. a flow tube through which a fluid stream to be metered is conducted, said tube having a longitudinal axis;
   B. a shedder having a predetermined geometry transversely disposed in said tube to divide the fluid stream therein and to cause vortices to be shed alternately on either edge thereof at a repetition rate proportional to the flow rate of the fluid, thereby producing downstream trains of vortices moving along the right and left sides of the tube;
   C. a torsionally-supported sensor disposed in said tube behind the shedder to define a gap therewith and provided with a pair of relatively broad parallel legs symmetrically disposed with respect to a spindle forming a central fulcrum axis which is normal to said tube axis, the opposite ends of the spindle extending outside of said tube, the divided fluid stream flowing past the shedder developing a torque about said fulcrum axis alternately in the clockwise and counterclockwise direction to cause the sensor to oscillate on the spindle at a frequency proportional to the flow rate of the fluid stream; and
   D. a pair of transducers operatively coupled to opposite ends of the spindle to produce two independent electrical signals whose frequency corresponds to the oscillating frequency of the sensor.

2. A flowmeter as set forth in claim 1, wherein said sensor has a frame-like form which includes said legs.

3. A flowmeter as set forth in claim 1, wherein said spindle is constituted by a pair of trunnions to torsionally suspend the frame at either end whereby the oscillations of said sensor at maximum torque results in microscopic motion.

4. A flowmeter as set forth in claim 3, wherein the ends of said trunnions extend through the wall of said tube and are provided with elastomeric "O" rings to seal said tube.

5. A flowmeter as set forth in claim 3, wherein said torsional suspension means are formed by resilient wires extending between said trunnions and fixed anchors.

6. A flowmeter as set forth in claim 5, wherein each of said transducers is constituted by a beam extending between one end of one of said trunnions and a fixed point, and a strain gauge mounted on the beam to detect the deformation thereof.

7. A flowmeter as set forth in claim 1, wherein said sensor has a structure providing a low moment of inertia.

* * * * *